United States Patent
Hayashi

(10) Patent No.: US 7,349,686 B2
(45) Date of Patent: Mar. 25, 2008

(54) MOBILE COMMUNICATION SYSTEM, RADIO TERMINAL USED THEREOF, RADIO NETWORK CONTROLLER AND OPERATION CONTROL METHOD THEREFOR

(75) Inventor: Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 429 days.

(21) Appl. No.: 10/748,165

(22) Filed: Dec. 31, 2003

(65) Prior Publication Data

US 2004/0152453 A1   Aug. 5, 2004

(30) Foreign Application Priority Data

Jan. 10, 2003   (JP) ............................. 2003-004712

(51) Int. Cl.
*H04M 1/663* (2006.01)

(52) U.S. Cl. .................. 455/412.2; 455/440; 455/442; 455/437; 370/331

(58) Field of Classification Search ............ 455/414.1, 455/435.1, 440, 442, 437, 412.2; 370/328, 370/331
See application file for complete search history.

(56) References Cited

U.S. PATENT DOCUMENTS 6,701,155 B2 *   3/2004   Sarkkinen et al. .......... 455/515

FOREIGN PATENT DOCUMENTS

| GB | 2 371 179 | 7/2002 |
|----|-----------|--------|
| GB | 2371179 A | 7/2002 |
| JP | 2002-368757 | 12/2002 |
| WO | WO 2004/017580 A1 | 2/2004 |

OTHER PUBLICATIONS

Chinese Office Action dated Feb. 24, 2006 (with English translation).
United Kingdom Search Report dated Jun. 25, 2004.

* cited by examiner

*Primary Examiner*—Nghi H. Ly
(74) *Attorney, Agent, or Firm*—McGinn IP Law Group, PLLC

(57) ABSTRACT

It is an object of the present invention to make it possible to grasp the number of terminals, which are planned to receive data of an MBMS service, accurately in an RNC even if movement of a radio terminal between RNCs occurs. In the case in which the movement of the radio terminal between RNCs has occurred during a period until the radio terminal actually received service data after it joined the MBMS service, the radio terminal notifies a moving destination RNC of at least identification information for specifying a moving source RNC. Then, the moving destination RNC notifies the RNC specified by the notified identification information that the radio terminal has left a cell. Consequently, both the moving source RNC and the moving destination RNC become capable of accurately grasping the number of radio terminals, which receive the service, and can perform judgment on whether a PtP system or a PtM system is adopted.

7 Claims, 6 Drawing Sheets

RNC FUNCTIONAL BLOCK DIAGRAM (IN THE CASE IN WHICH SERVICE BY PtM SYSTEM IS PERFORMED IN MOVING DESTINATION CELL)

MOBILE COMMUNICATION SYSTEM, RADIO TERMINAL USED THEREOF, RADIO NETWORK CONTROLLER AND OPERATION CONTROL METHOD THEREFOR

BACKGROUND OF THE INVENTION

1. Field of the Invention

The present invention relates to a mobile communication system, a radio terminal used therefor, a radio network controller and an operation control method therefor. In particular, the present invention relates to a mobile communication system, which has a function for broadcasting or multicasting service data including large volume contents such as voices and images to a plurality of radio terminals (users), and a radio terminal used therefor, as well as a radio network controller and an operation control method therefor.

2. Description of the Prior Art

In a mobile communication system, there is a service for broadcasting or multicasting large volume data of program contents to a plurality of radio terminals. This service is called an MBMS (Multimedia Broadcast Multicast Service). A schematic block diagram for such an MBMS function is shown in FIG. 5. Referring to FIG. 5, a BMSC (Broadcast Multicast Service Center) 1 is connected to an IP (internet Protocol) network 30 and is also connected to a plurality of RNCs (Radio Network Controllers) 4 and 5 via a GGSN (Gateway GPRS (General Packet Service) Support Node) 2 and an SGSN (Serving GPRS Support Node) 3.

The RNC 4 has NodeBs (radio base stations) 6 and 7 under its control and the RNC 5 has a NodeB 8 under its control. The respective NodeBs 6 to 8 are adapted to cover one or more cells 9 to 11, which are service areas. In the figure, for simplification of explanation, each NodeB is shown to cover one cell. Reference numeral 20 denotes a UE (user equipment), which indicates a radio terminal.

Note that interfaces between the SGSN 3 and the RNCs 4 and 5 are referred to as Iu, and interfaces between the RNCs 4 and 5 and the NodeBs 6 to 8 are referred to as Iub. Moreover, Iur also exists as an interface between the RNCs 4 and 5.

In the case in which the UE 20 shown in FIG. 5 desires delivery (broadcast/multicast) of the above-described MBMS service data, procedures shown in FIG. 6 are executed between the UE 20 and the BMSC 1. In other words, "SUBSCRIPTION" for application for subscribership in the service is generated by the UE 20 and sent to the BMSC 1 through the RNC 4 (step S1). Then, "SERVICE ANNOUNCEMENT" for announcement of the service is sent from the BMSC 1 (step S2), and "JOINING" for requesting to join the service is sent from the UE 20 in response to "SERVICE ANNOUNCEMENT" (step S3). Then, "MBMS MULTICAST MODE BEARER SET UP", which is bearer setup for the MBMS, is applied to the RNC 4 by the BMSC 1 (step S4).

Then, "MBMS NOTIFICATION" for notifying of the MBMS is sent from the RNC 4 to the UE 20 (step S5), and data of the MBMS is sent from the BMSC 1 to the RNC 4 (step S6). Thereafter, the data is delivered to the UE 20 (step S7). When delivery of all data ends, "MBMS MULTICAST MODE BEARER RELEASE" for bearer release is sent from the BMSC 1 (step S8), and "LEAVING" indicating withdrawal from the service is sent from the UE 20 (step S9) to end the processing.

Such a procedure shown in FIG. 6 is only an outline. Details of the procedure are disclosed in the recommendation of the 3GPP (THIRD GENERATION PARTNERSHIP PROJECT).

In such an MBMS, the RNC transfers service data to each UE in the cell under its control by the PtP (Point to Point) system or the PtM (Point to Multipoint) system. It is decided according to the number of UEs, which are existing in the cell and joining to be planned to receive the service data, whether the PtP system or the PtM system is used (see the above-described document). In other words, when the number of UEs has reached a fixed value (threshold value) or more, in terms of saving transmission power, the RNC delivers the service data by the PtM system. Conversely, when the number of UEs has fallen below the threshold value, the RNC delivers the service data by the PtP system.

After the UE has joined the service of the MBMS (step S3 of FIG. 6), there is a short time until the UE actually becomes capable of receiving the service data (step S7). During the time, movement of the UE between RNCs may occur. In other words, in FIG. 5, it is possible that the UE 20 joins the service of the MBMS while it is in a zone of the cell 10 of the NodeB 7 under the control of the RNC 4, and before receiving the service data, moves to the cell 11 of the NodeB 8 under the control of the RNC 5.

In such a case, the UE 20 notifies a moving destination RNC 5 that it has moved to the cell 11 under the control of the moving destination RNC 5. Thus, the moving destination RNC 5 is capable of learning that the UE 20 has moved thereto. However, in the current system, the moving source RNC 4 has no means for learning that the UE 20 has left the cell 10 under its control.

As described above, in the RNC, in delivering the service data of the MBMS, it is decided according to the number of UEs, which are planned to receive the service data, whether the PtP system or the PtM system is used. Thus, the RNC is required to grasp the number of UEs. However, the moving source RNC cannot learn the number of UEs.

BRIEF SUMMARY OF THE INVENTION

It is an object of the present invention to provide a mobile communication system, which is capable of grasping the number of UEs, which are planned to receive data of an MBMS service accurately even if movement of a UE between RNCs occurs, and a radio terminal used therefor, as well as a radio network controller and an operation control method therefor.

A mobile communication system according to the present invention is a mobile communication system having a function for delivering data of an identical service to a plurality of radio terminals, which is characterized in that, in accordance with movement of a radio terminal having joined the service between radio network controllers, the movement of the radio terminal is notified from a moving destination radio network controller to a moving source radio network controller.

A radio network controller according to the present invention is a radio network controller in a mobile communication system having a function for delivering data of an identical service to a plurality of radio terminals, which is characterized by including means which, when a radio terminal having joined the service has moved to a cell under control of the radio network controller, notifies a moving source radio network controller of the movement of the radio terminal.

A operation control method according to the present invention is an operation control method for a radio network controller in a mobile communication system having a function for delivering data of an identical service to a plurality of radio terminals, which is characterized by including a step of, when a radio terminal having joined the service has moved to a cell under control of the radio network controller, notifying a moving source radio network controller of the movement of the radio terminal.

A radio terminal according to the present invention is a radio terminal in a mobile communication system having a function for delivering data of an identical service to a plurality of users, which is characterized by including means which, in response to movement of the radio terminal between radio network controllers after the radio terminal has joined the service, sends identification information specifying a moving source radio network controller to a moving destination radio network controller.

A program according to the present invention is a program for causing a computer to execute an operation control method for a radio network controller in a mobile communication system having a function for delivering data of an identical service to a plurality of radio terminals, which is characterized by including a step of, when a radio terminal having joined the service has moved to a cell under control of the radio network controller, notifying a moving source radio network controller of the movement of the radio terminal.

Operations of the present invention will be described. In a mobile communication system having an MBMS function for delivering MBMS service data (identical data) including large volume contents such as voices or images to a plurality of radio terminals, in the case in which movement of a radio terminal between radio network controllers has occurred during a period until the radio terminal actually received service data after it joined the service, at least identification information for specifying a moving source radio network controller is notified from the radio terminal to a moving destination radio network controller. Then, the moving destination radio network controller notifies the radio network controller specified by the notified identification information that the radio terminal has left a cell.

Consequently, not only the moving source radio network controller but also the moving destination radio network controller can accurately grasp the number of radio terminals, which receive the service, and the determination on whether the PtP system or the PtM system is used can be performed accurately.

DETAILED DESCRIPTION OF THE PREFERRED EMBODIMENTS

Figure 1:
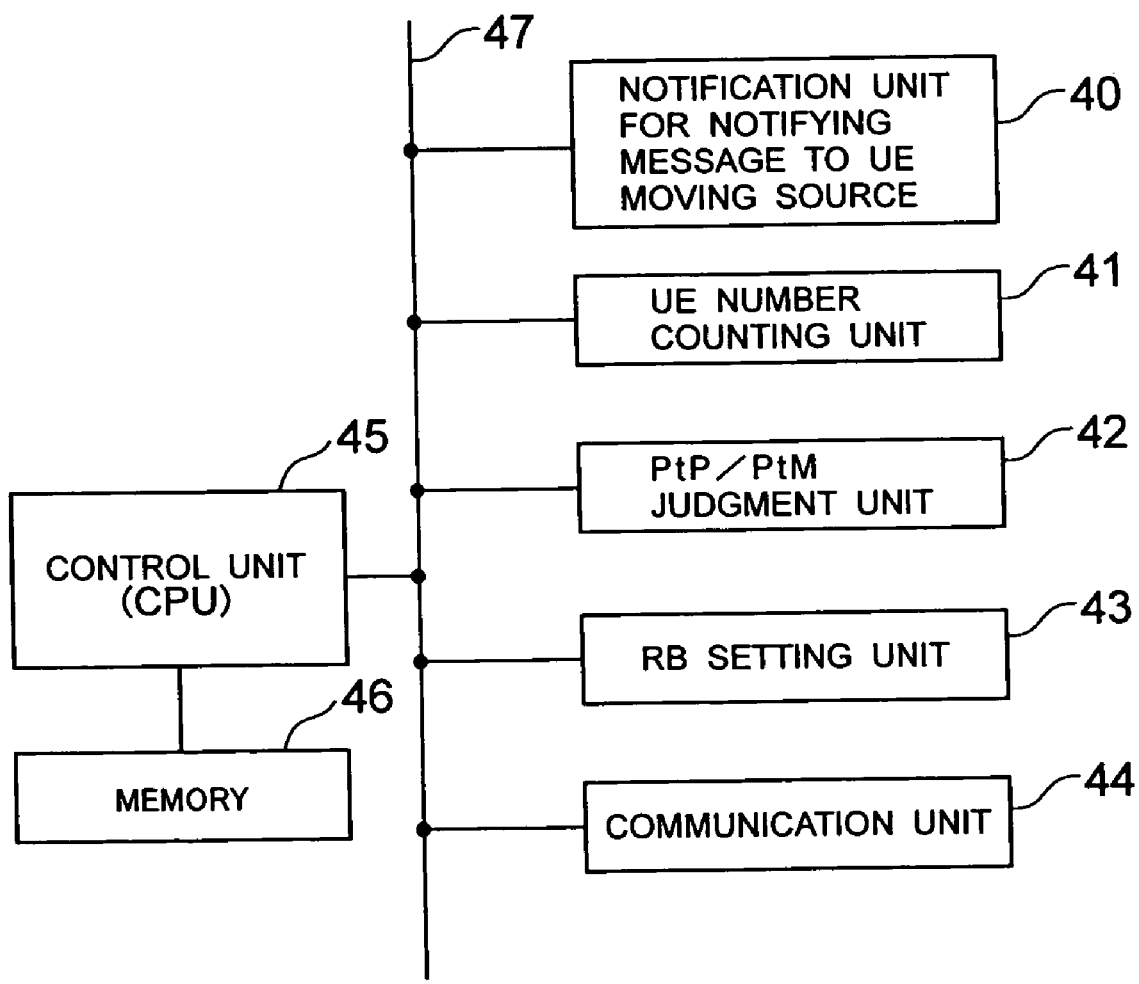
FIG. 1 is a functional block diagram of an RNC (radio network controller) which is applied to an embodiment of the present invention.
Figure 5:
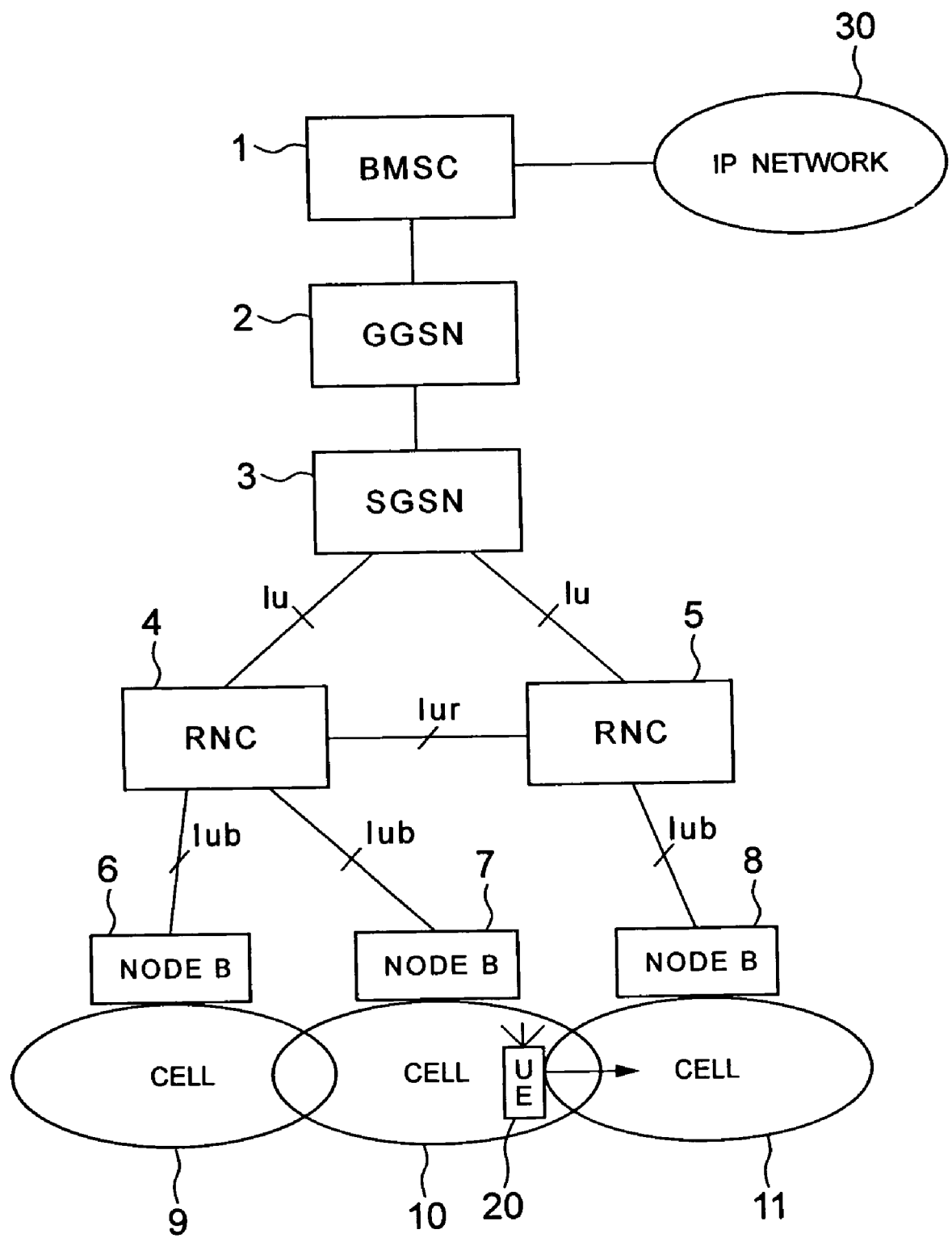
FIG. 5 is a schematic diagram of a mobile communication system to which the present invention is applied.
Figure 6:
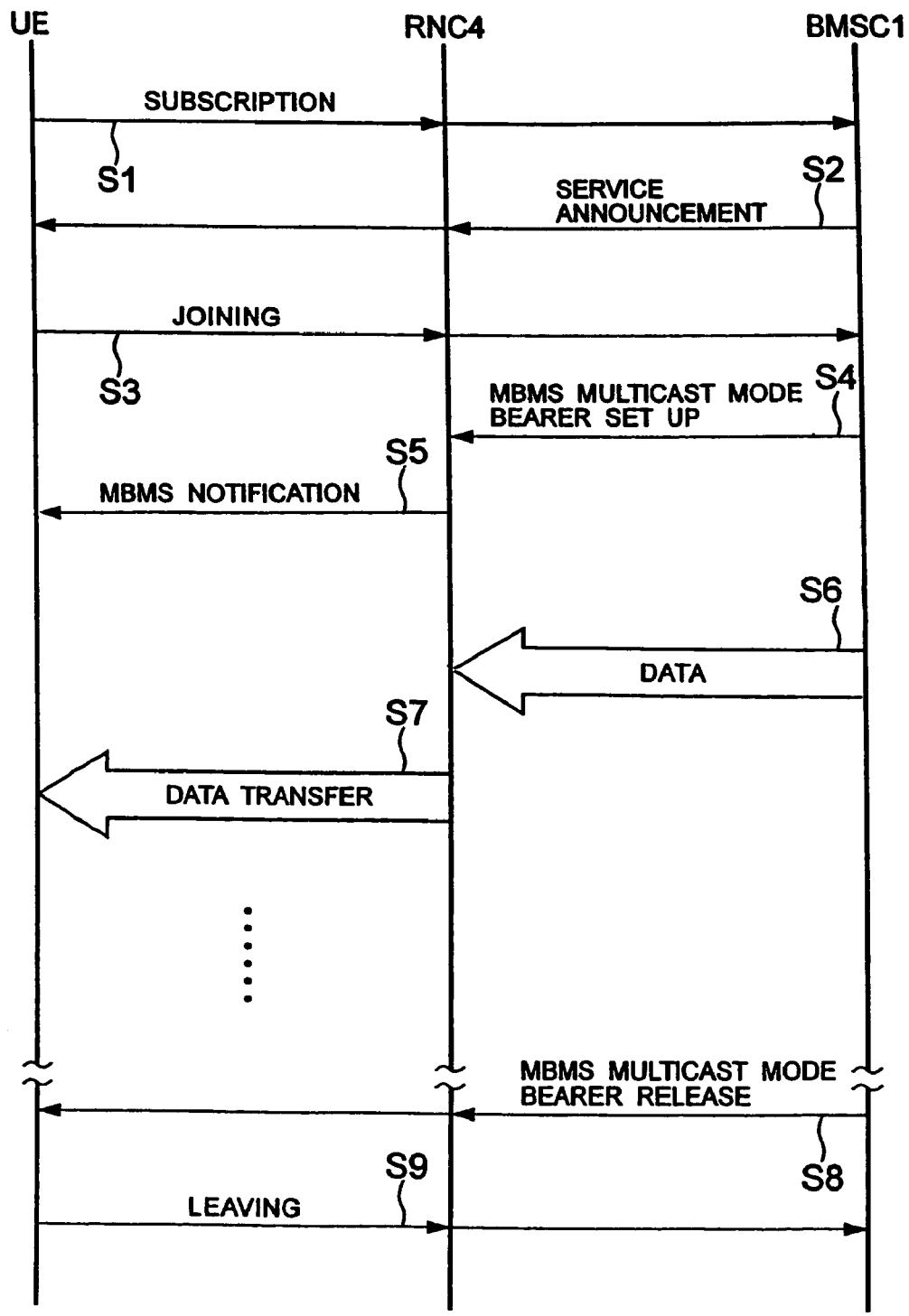
FIG. 6 is an operation sequence diagram of a prior art MBMS service.

Embodiments of the present invention will be hereinafter described with reference to the accompanying drawings. FIG. 1 is a schematic functional block diagram of an RNC (radio network controller) in the embodiments of the present invention. It is assumed that the RNC is a moving destination RNC 5 in the case in which a UE 20 moves between RNCs in the system diagram of FIG. 5. Referring to FIG. 1, a notification unit 40 for notifying a message to a UE (radio terminal) moving source has a function for, following the movement of the UE 20 between the RNCs shown in FIG. 5, notifying a moving source RNC that the UE 20 has left the cell 10 on the basis of a signal sent from the UE. A UE number counting unit 41 has a function for counting the number of UEs which exist in a zone of a cell under control of the RNC and receive an identical service.

A PtP/PtM judgment unit 42 has a function for judging whether a delivery system for MBMS service data is set to a PtP system or a PtM system according to a counting value of the UE number counting unit 41. An RB setting unit 43 has a function for performing bearer setup for delivery of the MBMS service data in accordance with the judgment in the PtP/PtM judgment unit 42. A communication unit 44 has a function for communicating with the NodeB under its control and with the BMSC 1 via the upper SGSN3 and GGSN 2 and also communicating with the other RNC (4) via the interface Iur between the RNCs.

A control unit 45 is a CPU (central processing unit: computer). A memory 46 has a ROM having stored therein an operation procedure for the CPU as a program in advance and a RAM serving as a work memory for the CPU. Control of the respective units 40 to 44 is executed by this CPU in accordance with the program. Note that reference numeral 47 denotes a common bus.

Figure 2:
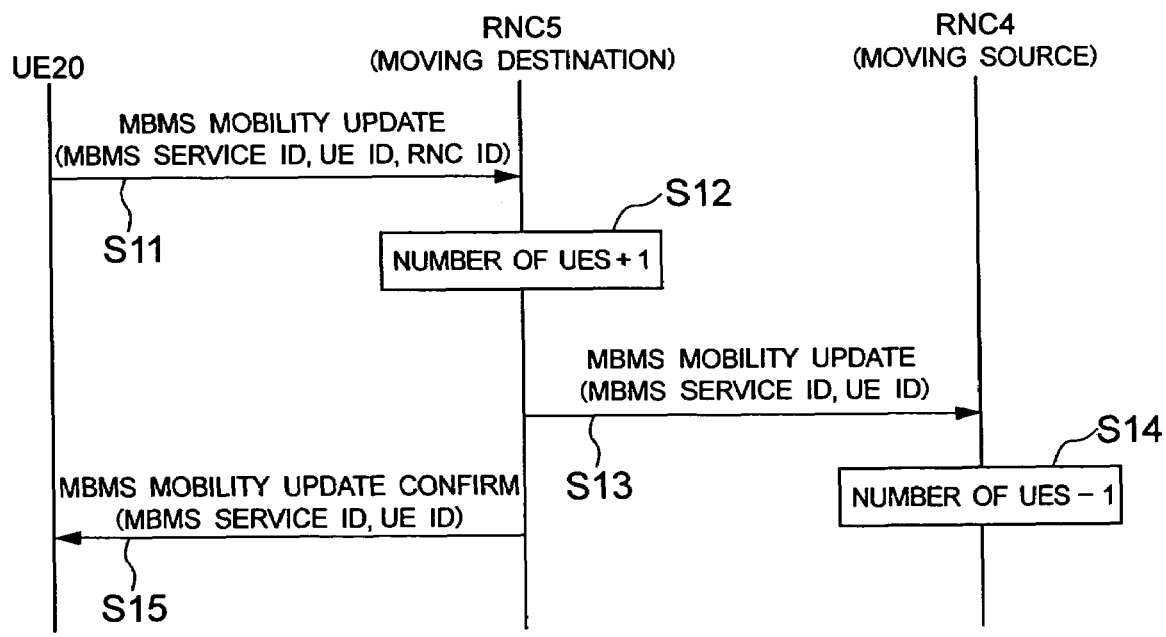
FIG. 2 is an operation sequence diagram of a first embodiment of the present invention.

FIG. 2 is a sequence diagram showing an operation procedure of a first embodiment of the present invention. The sequence diagram shows an operation sequence among the UE 20, the moving destination RNC 5, and the moving source RNC 4 shown in FIG. 5. As a premise in this embodiment, it is assumed that the UE 20 has moved from the cell 10 under control of the RNC 4 to the cell 11 under control of the RNC 5 during a period until the UE 20 could actually receive service data after it joined the MBMS service (an idle mode or a standby state), and that a radio bearer for the MBMS has not been set in the moving destination cell 11 and no radio bearer has been set in the UE 20.

When the UE 20 has moved from the cell 10 to the cell 11 according to the movement of the UE 20 between RNCs, it sends a message of "MBMS Mobility Update", to the moving destination RNC 5 (step S11). It is assumed that this message includes an "MBMS Service ID" for specifying the MBMS service, a "UE ID" for specifying the UE 20, and an "RNC ID" for specifying the moving source RNC. The RNC 5 having received this notification counts up the number of UEs, which receive the MBMS service, by "1" with the UE number counting unit 41 (step S12).

At the same time, the RNC 5 sends a message, which notifies that the UE 20 has left a cell, to the moving source RNC 4 via the Iur interface with the notification unit 40 for notifying a message to a UE moving source (step S13). It is assumed that this message includes an "MBMS Service ID" for specifying the MBMS service and a "UE ID" for specifying the UE 20. The RNC 4 having received this notification counts down the number of UEs, which receive the MBMS service, by "1" with the UE number counting unit 41 (step S14). The moving destination RNC 5 sends "MUMS Mobility Update Confirm", which is a message for confirmation, to the UE 20 (step S15). This message includes an "MBMS service ID" and a "UE ID".

Figure 3:
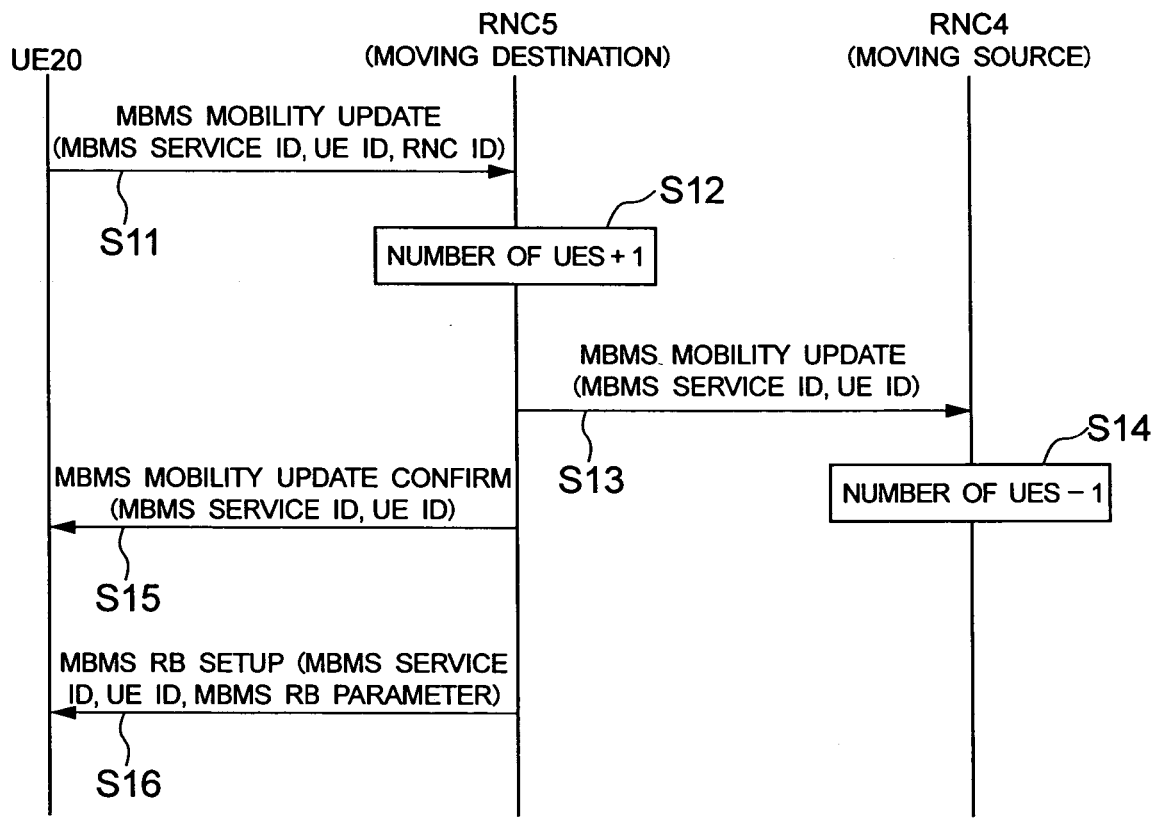
FIG. 3 is an operation sequence diagram of a second embodiment of the present invention.

FIG. 3 is a sequence diagram showing an operation procedure of a second embodiment of the present invention. FIG. 3 shows an operation sequence among the UE 20, the moving destination RNC 5, and the moving source RNC 4 shown in FIG. 5. As a premise in this embodiment, it is assumed that the UE 20 has moved from the cell 10 under control of the RNC 4 to the cell 11 under control of the RNC 5 during a period until the UE 20 could actually receive service data after it joined the MBMS service (an idle mode or a standby state), and that data of the MBMS service has already been transmitted to the moving destination cell 11 by the PtM system.

In this embodiment, steps S11 to S15 of the sequence are identical with those in FIG. 2 in the first embodiment. Thereafter, a message for setup of an RB (radio bearer) for the MBMS service is sent to the UE 20 from the RNC 5 (step S16). This message includes an "MBMS Service ID" and an "MBMS RB parameter". The "MBMS RB parameter" is information indicating a channel of the radio bearer. Consequently, the UE 20 can make connection to a common channel, through which the MBMS service data is delivered, to receive the service.

Figure 4:
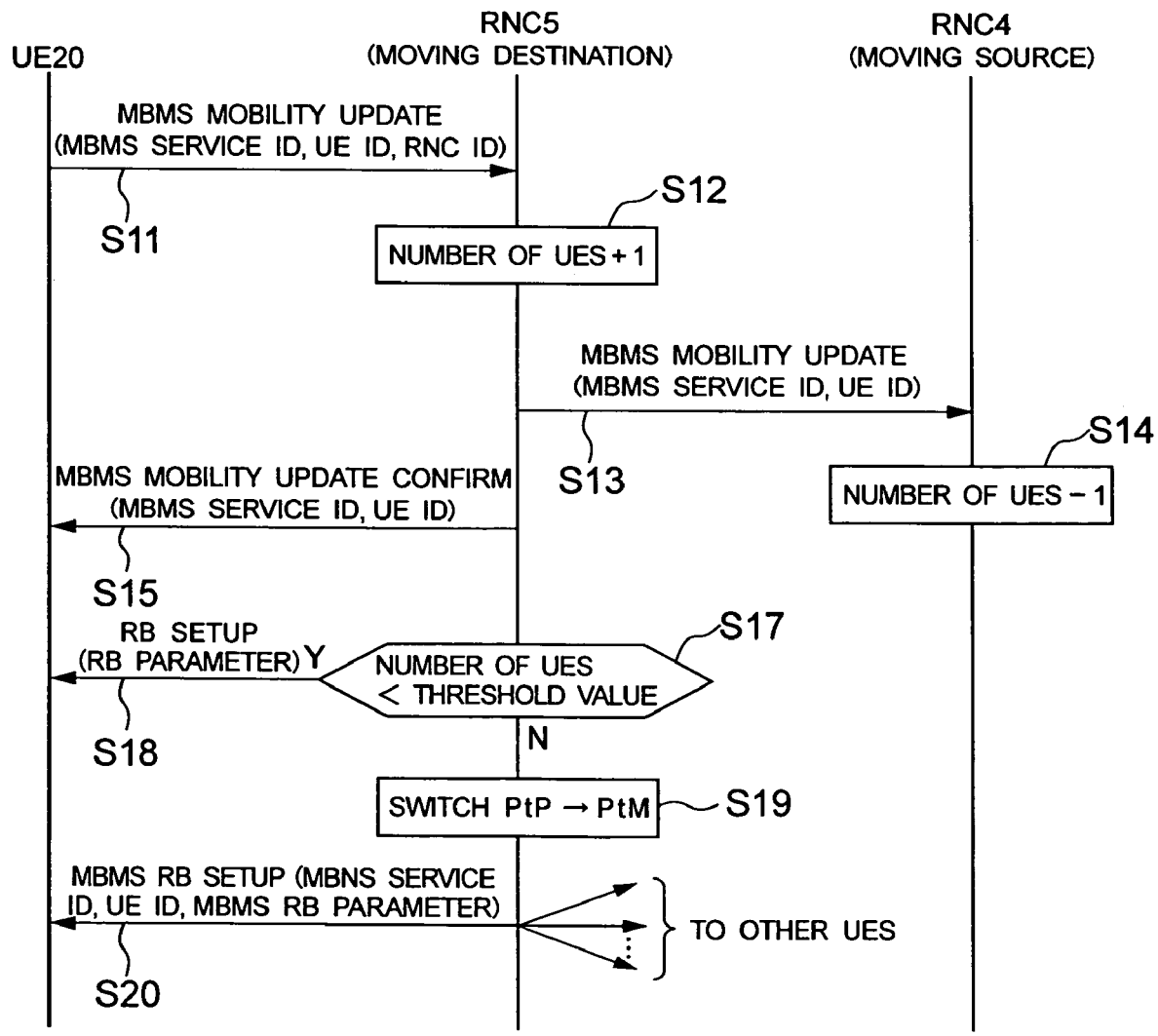
FIG. 4 is an operation sequence diagram of a third embodiment of the present invention.

FIG. 4 is a sequence diagram showing an operation procedure of a third embodiment of the present invention. FIG. 4 shows an operation sequence among the UE 20, the moving destination RNC 5, and the moving source RNC 4 shown in FIG. 5. As a premise in this embodiment, it is assumed that the UE 20 has moved from the cell 10 under control of the RNC 4 to the cell 11 under control of the RNC 5 during a period until the UE 20 could actually receive service data after it joined the MBMS service (an idle mode or a standby state), and that data of the MBMS service has already been transmitted to the moving destination cell 11 according to the PtP system.

In this embodiment, steps S11 to S15 of the sequence are identical with those in FIG. 2 in the first embodiment. Thereafter, judgment on the PtP system and the PtM system is performed in the PtP/PtM judgment unit 42 in the RNC 5. Since this judgment depends upon the number of UEs, the number of UEs (a counted value of the UE number counting unit 41) and a threshold value are compared. If the number of UEs is smaller than the threshold value ("Y" in step S17), the PtP system is maintained, and service data is delivered through a dedicated channel for each UE. Therefore, an "RB Setup" message is also sent to the UE 20 from the RB setting unit 43 of the RNC 5 such that the data is delivered by the PtP system (step S18). This message includes a parameter indicating a channel of the radio bearer.

If it is judged in step S17 that the number of UEs is equal to or more than the threshold value, the PtP system is switched to the PtM system in the RB setting unit 43 (step S19), and a message for setup of the RB (radio bearer) for the MBMS service is sent to the UE 20 (step S20). This message includes an "MBMS Service ID", a "UE ID", and an "MBMS RB parameter". The "MBMS RB parameter" is information indicating a channel of the radio bearer. Consequently, the UE 20 can make connection to a common channel, through which the MBMS service data is delivered, to receive the service. The message (step 20) which indicates that the PtP dedicated channel is switched to the PtM common channel, is also sent to other UEs which receive the same service.

As described above, according to the present invention, both the moving source RNC and the moving destination RNC become capable of learning that a UE has left a cell or entered a zone of the cell. Thus, there is an effect that switching of the PtP system and the PtM system with respect to a radio bearer for delivery of MBMS service data can be performed appropriately.

What is claimed is:

1. A mobile communication system for delivering identical data from a data source to a plurality of radio terminals, said mobile communication system comprising a plurality of radio network controllers, each controller including circuitry for counting the number of radio terminals connected to such controller to receive the data from the data source and circuitry for controlling delivery of the data within an associated cell, wherein the system is arranged and configured such that:

when a radio terminal within a first cell is connected to the controller associated with the first cell, upon movement of the radio terminal from the first cell to a second cell, the radio terminal establishes connection to the controller associated with the second cell;

in response to connection of the radio terminal to the controller associated with the second cell, the count of connected radio terminals maintained by the circuitry for counting in the controller associated with the first cell is decremented and the count of connected radio terminals maintained by the circuitry for counting in the controller associated with the second cell is incremented;

the number of radio terminals connected to the controller associated with the second cell is compared with a predetermined number;

if the number of radio terminals connected to the controller associated with the second cell is less than the predetermined number, a dedicated channel is set between the radio terminal and the controller associated with the second cell;

if the number of radio terminals connected to the controller associated with the second cell is equal to or greater than the predetermined number, a common channel is set between the radio terminal and the controller associated with the second cell; and the data is delivered from the controller associated with the second cell to the radio terminal over the set channel.

2. A method of operating a mobile communication system to deliver identical data from a data source to a plurality of radio terminals, the mobile communication system including a plurality of radio network controllers, each controller maintaining a count of the minter of radio terminals connected to such controller to receive the data from the data source and controlling delivery of the data within an associated cell, said method comprising:

connecting a radio terminal within a first cell to the controller associated with the first cell;

upon movement of the radio terminal from the first cell to a second cell, connecting the radio terminal to the controller associated with the second cell;

decrementing the count of connected radio terminals maintained by the controller associated with the first cell;

incrementing the count of connected radio terminals maintained by the controller associated with the second cell;

comparing the number of radio terminals connected to the controller associated with the second cell with a predetermined number;

if the number of radio terminals connected to the controller associated with the second cell is less than the predetermined number, setting a dedicated channel between the radio terminal and the controller associated with the second cell;

if the number of radio terminals connected to the controller associated with the second cell is equal to or greater than the predetermined number, setting a common channel between the radio terminal and the controller associated with the second cell; and delivering the data from the controller associated with the second cell to the radio terminal over the set channel.

3. The method according to claim 2, wherein the movement of the radio terminal between radio network controllers is movement during a period before data reception after said radio terminal has joined the service.

4. The method according to claim 2, wherein the movement of the radio terminal is movement during an idle mode or a standby state.

5. A computer readable medium having stored thereon a program for causing a computer to execute an operation control method to cause a mobile communication system to deliver identical data from a data source to a plurality of radio terminals, the mobile communication system including a plurality of radio network controllers, each controller maintaining a count of the number of radio terminals connected to such controller to receive the data from the data source and controlling delivery of the data within an associated cell, said method comprising:

connecting a radio terminal within a first cell to the controller associated with the first cell;

upon movement of the radio terminal from the first cell to a second cell, connecting the radio terminal to the controller associated with the second cell;

decrementing the count of connected radio terminals maintained by the controller associated with the first cell;

incrementing the count of connected radio terminals maintained by the controller associated with the second cell;

comparing the number of radio terminals connected to the controller associated with the second cell wit a predetermined number;

if the number of radio terminals connected to the controller associated with the second cell is less than the predetermined number, setting a dedicated channel between the radio terminal and the controller associated wit the second cell;

if number of radio terminals connected to the controller associated with the second cell is equal to or greater than the predetermined number, setting a common channel between the radio terminal and the controller associated with the second cell; and delivering the data from the controller associated with the second cell to the radio terminal over the set channel.

6. The computer readable medium according to claim 5, wherein the movement of the radio terminal between radio network controllers is movement before a period until data reception after said radio terminal has joined the service.

7. The computer readable medium according to claim 5, wherein the movement of the radio terminal is movement during an idle mode or a standby state.

* * * * *